United States Patent [19]

Morin

[11] 4,345,583

[45] Aug. 24, 1982

[54] WATER HEATER USING SOLAR AND NON-SOLAR ENERGY

[75] Inventor: Claude Morin, Saint Lattier, France

[73] Assignee: Pechiney Ugine Kuhlmann, Paris, France

[21] Appl. No.: 68,453

[22] Filed: Aug. 21, 1979

[30] Foreign Application Priority Data

Aug. 21, 1978 [FR] France .................. 78 24848

[51] Int. Cl.³ .................. F24J 3/02; G05D 23/00
[52] U.S. Cl. .................. 126/427; 126/437; 236/12 R
[58] Field of Search .................. 126/427, 452, 437; 165/18, 40; 219/314, 279; 236/91 R, 12 R

[56] References Cited

U.S. PATENT DOCUMENTS 4,191,172  3/1980  Walch, Jr. .................. 126/427

FOREIGN PATENT DOCUMENTS

| 239267 | 6/1960 | Australia .................. 126/427 |
| 2610516 | 9/1977 | Fed. Rep. of Germany ...... 126/427 |
| 2638357 | 3/1978 | Fed. Rep. of Germany ...... 126/427 |
| 2730047 | 1/1979 | Fed. Rep. of Germany ...... 126/427 |
| 2403524 | 5/1979 | France .................. 126/427 |

*Primary Examiner*—Albert J. Makay
*Assistant Examiner*—Henry Bennett
*Attorney, Agent, or Firm*—Dennison, Meserole, Pollack & Scheiner

[57] ABSTRACT

An apparatus for the preparation of hot water using solar energy and non-solar auxiliary energy. Solar heated water in a reservoir is provided for utilization if it is at least at a desired temperature. If the solar heated water is not sufficiently hot, an auxiliary gas heater is used to heat a second reservoir of water to at least the desired temperature. A thermostatic mixer is capable of supplying solar heated water mixed with auxiliary heated water, or only auxiliary heated water, or only solar heated water for utilization. The non-solar heater is utilized only when necessary.

10 Claims, 3 Drawing Figures

WATER HEATER USING SOLAR AND NON-SOLAR ENERGY

The invention constituting the subject of U.S. Pat No. 4,165,732, issued Aug. 28, 1979, relates to a process for preparing hot water wherein the water is heated using two reservoirs, one of which is heated by solar energy and the other by non-solar energy, which process involves considerable improvements permitting far better utilisation of the solar energy and consequently a reduced consumption of the non-solar energy.

Experience has shown however that this process presents certain drawbacks due in particular to the use of a non-solar auxiliary heating means based on the principle of accumulation, or heat storage in a reservoir and consequently provides relatively little instantaneous power.

If this non-solar means is electrical energy, then its use at peak hours is costly. Use at a reduced tariff at off-peak hours, i.e. during the night, is certainly possible but then the auxiliary heating is no longer in phase with the solar heating and no longer plays an efficient enough role. Consequently, it is found at the end of the day when the sun's rays have been weak that there is no water remaining for use, at a sufficiently high temperature, and there is no possibility of supplying any auxiliary energy.

In order to overcome these difficulties the idea was conceived of combining with the solar heating by accumulation, an instantaneous auxiliary heating using gas which is the most flexible and economic means for such use. The initial tests gave rise to serious difficulties in adaptation due to the fact that the instantaneous gas heaters are designed to heat cold water and not to reheat water which is already warm. These apparatuses are in fact equipped with an ignition device which is actuated automatically when a flow of water is passed through its heater unit, regardless of the temperature of this water upon entry. Research has been carried out into the possibility of using such apparatuses without any modification under conditions such that they would only be activated in cases where the temperature of the water withdrawn from the reservoir heated by solar energy is too low.

A simple and efficient apparatus has been found and forms the subject of the present invention. This apparatus permits the operator to immediately obtain water at the desired temperature by opening the hot water tap at any hour of the day. This water will have been heated either by solar energy alone or by a combination of solar energy and instantaneous gas heating or again by gas heating alone.

This apparatus involves the use of a thermostatic mixer provided with a temperature regulating means, supplied on the one hand with water from the solar heated reservoir and on the other hand with water from the cold water supply which is heated by passing through the heater nest of the instantaneous gas water heater. Such a thermostatic mixer in itself of known type is mounted in such a way that it only permits water from the reservoir to pass while the temperature of this water is equal to or higher than the regulating temperature of the mixer. If, on the contrary, the regulating temperature of the mixer is higher than that of the water coming from the reservoir, the mixer opens the passage at an additional inlet for water coming from the gas water heater. This opening causes the gas to ignite and the instantaneous heating of the water. The mixer then automatically ensures mixing in suitable proportions of the water coming from the gas water heater and the water coming from the reservoir so that the water for use reaches the regulating temperature.

The description and the drawings hereinafter enable the operating of the devices permitting implementation of the invention to be more easily understood.

FIG. 1 illustrates a device for carrying out the method according to the invention.

Figure 1:
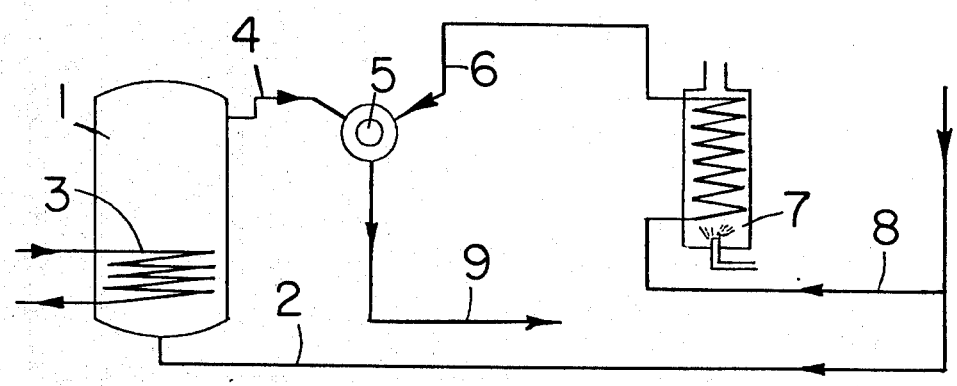
FIG. 1 is an overall diagram of the device for carrying out the method which is the subject of the invention.

A reservoir (1) receives in its lower region cold water through pipe (2) connected to the water supply system. An exchanger (3), connected to a solar heat collector (not shown), ensures that the reservoir is heated by solar energy. A pipe (4) permits hot water to be withdrawn from the upper region of the reservoir and to be conveyed to the thermostatic mixer (5). This mixer is also fed through pipe (6) with water coming from the instantaneous gas water heater. This water heater is supplied with cold water through pipe (8) which is connected to the system. The water heater (7) is provided in a known manner with a device which ensures that it is ignited each time that water is withdrawn through pipe (6). Finally, the thermostatic mixer (5) is connected to the hot water service pipe (9). Experience has shown that a device of this kind operates in a very satisfactory way as soon as the thermal equilibrium is achieved, in other words as soon as the temperature of the thermostatic mixer and in particular that of its measuring element is stabilized. There is therefore a transitory period dependent upon the length of the pipes during which the temperature of the mixer is practically always lower than the adjusting temperature. As a result, throughout this period the water inlet through pipe (6) is open and consequently the gas water heater is started up. This occurs even if the temperature of the water in the reservoir is equal to or higher than the adjusting temperature. In the latter case, after a certain period of operation, the rise in temperature of the thermostatic mixer will cause the progressive closing of the water inlet through pipe (6) and consequently cause the gas water heater (7) to cease operation. An operation of this kind is of little use for short but frequently repeated periods and may be relatively costly. Research has therefore been carried out into the possibility of further improving the operation of this device and two very important improvements have been developed and likewise form part of the invention.

Figure 2:
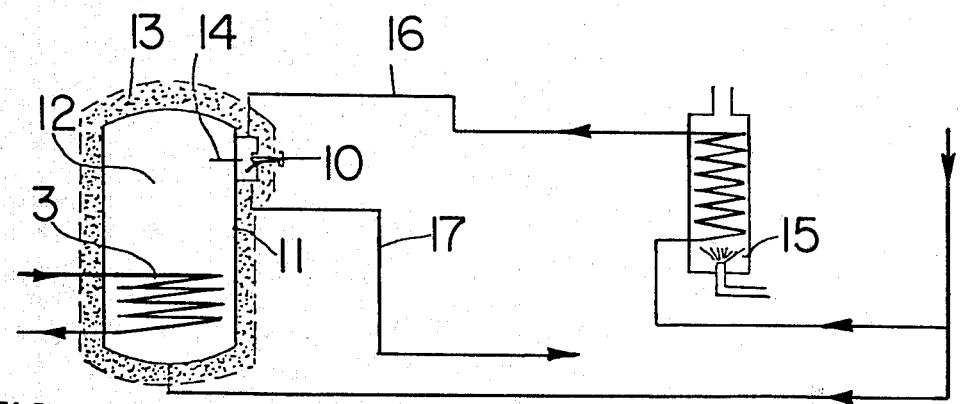
FIG. 2 shows an improvement to the diagram shown in FIG. 1 which enables anomalies in the operating of the gas heating means to be avoided.

The first improvement, which is described in the diagram of FIG. 2, comprises bringing the thermostatic mixer, or at least its temperature-measuring element, to a temperature as near as possible to that prevailing in the reservoir. This can be achieved by placing the mixer in thermal communication with the reservoir, for example by placing it in the actual interior of the reservoir in contact with the water contained therein or by mounting it on the external surface of the wall of the reservoir and covering it, just as the reservoir itself is covered, with a heat-insulating layer. In the diagram shown in FIG. 2 the thermostatic mixer (10) is set in contact with the wall (11) of the solar-heated reservoir (12). The insulating layer (13) covers both the reservoir and the mixer (10) simultaneously. This mixer is connected directly to the reservoir through orifice (14). It is also connected to the gas water heater (15) through pipe (16) and to the utilization circuit through pipe (17).

Under these conditions the mixer already assumes an adjusting position before the hot water utilization circuit (17) is opened. If the temperature of the water in the reservoir reaches or surpasses the adjusting temperature, the inlet for water coming from the gas water heater (15) through pipe (16) will be closed and will remain closed as long as the temperature of the water in the reservoir does not drop below this adjusting temperature.

If, on the contrary, the temperature of the water in the reservoir is lower than the adjusting temperature, the thermostatic mixer (10) will adopt an adjusting position which will open an inlet for auxiliary water coming from the gas water heater through pipe (16) and under these conditions as soon as the utilization circuit (17) is opened the demand for water through pipe (16) will cause the water heater to be lit. Proportionately to the way in which the water coming from this water heater, which is hotter than that coming from the reservoir, is circulated in the mixer, the latter will reach a stable adjusting position ensuring the supply of water at the adjusted temperature.

Figure 3:
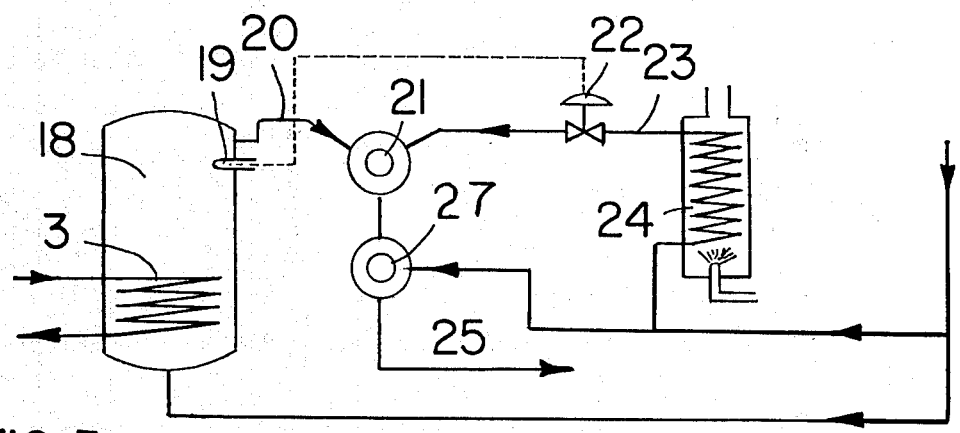
FIG. 3 shows another improvement to the diagram shown in FIG. 1 which also enables these operational anomalies to be avoided.

In those cases wherein it is not possible to dispose the thermostatic mixer such that its temperature measuring element is brought to a temperature equal to or very close to that of the reservoir, without withdrawing water, another arrangement can be achieved, which is described in FIG. 3.

A thermostatic probe (19) is introduced into the solar-heated reservoir (18) generally in the vicinity of the orifice of the outlet pipe (20) which connects the reservoir to the thermostatic mixer (21). This probe controls in a known manner the opening or closing of the valve (22) which is disposed on the water pipe (23) which connects the instantaneous water heater (24) to the thermostatic mixer (21). The valve (22) is controlled in such a way that it opens or closes depending upon whether the temperature of the solar reservoir is lower or higher than the adjusting temperature displayed on the mixer (21), which corresponds to the desired utilization temperature "$t_u$". In this way, if the temperature $t_s$ of the reservoir reaches or surpasses the temperature $t_u$ the valve (22) remains closed. If, under these conditions the utilization circuit (25) is opened water from the water heater will not pass through the mixer and consequently the heater will not be lit. Only water from the reservoir (18) will be supplied and the temperature of the water in the utilization circuit will progressively reach the temperature of the water contained in the reservoir without supplying water heated by gas. On the contrary, if the temperature of the water in the reservoir is lower than $t_u$, the valve (22) will be opened and the opening of the utilization circuit will cause a demand for auxiliary water through the mixer coming from the water heater which will be lit. When the desired utilization temperature $t_u$ is lower than the temperature of the water contained in the reservoir it is desirable to be able to supply cold water in the desired proportions. This result is obtained by means of a second thermostatic mixer 27 which is fed with hot water by the water coming from the first mixer and with cold water by a pipe connected to the water supply system.

Other apparatus for carrying out the invention can be envisaged without going beyond the scope of the invention.

In particular, it is possible to use any type of instantaneous gas water heater which is lit by the passage of water therethrough, this lighting being achieved by a pilot light or an electric sparking device. The water heater may also be provided with a device which adjusts the heating power in dependence on the rate of flow of water to be heated which passes through its heater unit.

Finally, instead of a gas water heater another non-solar heating means may be used, such as an instantaneous water heater with a fuel burner for example.

I claim:

1. Apparatus for the preparation of hot water comprising:
   (a) a solar heating system including a reservoir for water, said reservoir having a cold water inlet and a solar heated water outlet, and a solar heating means for heating water in said reservoir;
   (b) an auxiliary non-solar heating system independent of said solar heating system and having an instantaneous heating means operable to instantaneously heat water whenever water flows through said non-solar heating system, said instantaneous heating means having a cold water inlet and a hot water outlet;
   (c) thermostatic mixing means, said solar heating system outlet and said non-solar heating system hot water outlet separately coupled to said thermostatic mixing means for independent reception, by said thermostatic mixing means, of solar heated water from said reservoir outlet and hot water from said hot water outlet, said thermostatic mixing means being normally closed to said hot water outlet and adapted to sense the temperature of the water received from said reservoir outlet to open flow of water from said hot water outlet if the sensed temperature is below a selected value; and
   (d) means for withdrawing water from said thermostatic mixing means.

2. An apparatus according to claim 1 wherein said thermostatic mixing means closes flow from said reservoir outlet and opens flow from said hot water outlet when the sensed temperature is below said selected value.

3. An apparatus according to claim 1 wherein said thermostatic mixing means opens flow from said reservoir outlet and said hot water outlet when the sensed temperature is below said selected value.

4. An apparatus according to claim 1 wherein said instantaneously heating means comprises a gas heater.

5. An apparatus according to claim 1 further comprising a valve disposed between said thermostatic mixing means and said hot water outlet, and a probe means coupled to said valve and in thermal communication with said reservoir, whereby said probe means remotely controls the actuation of said valve.

6. An apparatus according to claim 1 further comprising a source of cold water having a temperature below the selected temperature, and a second thermostatic mixing means coupled to receive water from said source of cold water and said first thermostatic mixing means but normally closed to said source of cold water and adapted to sense the temperature of the water received from said first thermostatic mixing means and to open flow from said source of cold water if the sensed temperature of water from said first thermostatic mixing means is above a desired utilization temperature.

7. An apparatus according to claim 1 wherein said thermostatic mixing means is disposed in thermal communication with said reservoir.

8. An apparatus according to claim 7 wherein said thermostatic mixing means is disposed inside said reservoir.

9. An apparatus according to claim 7 wherein said thermostatic mixing means is disposed adjacent the external wall of said reservoir.

10. An apparatus according to claim 9 further comprising an insulating layer for externally covering the wall of said reservoir, wherein said thermostatic mixing means is disposed between the wall of the reservoir and said insulating layer.

* * * * *